US008250306B2

(12) United States Patent
Larkby-Lahet et al.

(10) Patent No.: US 8,250,306 B2
(45) Date of Patent: Aug. 21, 2012

(54) METHOD FOR IMPROVING FREQUENCY-BASED CACHING ALGORITHMS BY MAINTAINING A STABLE HISTORY OF EVICTED ITEMS

(75) Inventors: James Allen Larkby-Lahet, Pittsburgh, PA (US); Prashant Pandey, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1154 days.

(21) Appl. No.: 12/109,258

(22) Filed: Apr. 24, 2008

(65) Prior Publication Data

US 2009/0271574 A1    Oct. 29, 2009

(51) Int. Cl.
*G06F 12/00*    (2006.01)
*G06F 13/00*    (2006.01)
*G06F 13/28*    (2006.01)
(52) U.S. Cl. ........................................ 711/133; 711/118
(58) Field of Classification Search .................. 711/133, 711/118
See application file for complete search history.

(56) References Cited

U.S. PATENT DOCUMENTS

| | | | |
|---|---|---|---|
| 6,996,676 B2 * | 2/2006 | Megiddo et al. ............... | 711/129 |
| 7,058,766 B2 | 6/2006 | Modha | |
| 7,096,321 B2 | 8/2006 | Modha | |
| 7,143,240 B2 | 11/2006 | Hsu et al. | |
| 7,228,388 B2 | 6/2007 | Hu et al. | |
| 2003/0217230 A1 * | 11/2003 | Rodriguez et al. ............ | 711/136 |
| 2006/0069876 A1 | 3/2006 | Bansal et al. | |
| 2006/0129782 A1 | 6/2006 | Bansal et al. | |
| 2008/0120496 A1 * | 5/2008 | Bradford et al. .............. | 712/239 |

OTHER PUBLICATIONS

J. Gecsei et al., "Evaluation techniques for storage hierarchies," IBM Sys. J., vol. 9, No. 2, pp. 78-117, 1970.
E.J. O'Neil et al. "An Optimality Proof of the LRU-K Page Replacement Algorithm," Journal of the ACM, vol. 46, No. 1, pp. 92-112, 1999.
S. Jiang et al., "LIRS: An Efficient Low Inter-Reference Recency Set Replacement Policy to Improve Buffer Cache Performance," Proc. ACM Sigmetrics Conf., p. 31-42, 2002.

(Continued)

*Primary Examiner* — Stephen Elmore
*Assistant Examiner* — Mark Giardino, Jr.
(74) *Attorney, Agent, or Firm* — Kenneth L. Sherman, Esq.; Michael Zarrabian, Esq.; Sherman & Zarrabian LLP (57) ABSTRACT

The invention provides a method for improving frequency-based caching algorithms by maintaining a stable history of evicted items. One embodiment involves a process for caching data in a cache memory including logical pages including, upon detecting that a first page is being evicted from the cache memory, performing an addition process by adding metadata of the first page to a stable history list. Upon detecting a cache miss for a second page, if the stable history list contains metadata for the second page, then removing the second page metadata from the stable history list and applying a promotion determination for the second page to determine a priority value for the second page metadata and placing the second page in the cache memory based on the priority data. Upon detecting that metadata of a third page is to be evicted from the stable history list, applying an eviction determination to evict metadata of the third page from the stable history list based on a predetermined caching rule.

17 Claims, 6 Drawing Sheets

OTHER PUBLICATIONS

T. Johnson et al., "2Q: A Low Overhead High-Performance Buffer Management Replacement Algorithm," Proc. VLDB Conf., Morgan Kaufmann, 1994, pp. 439-450.

D. Lee et al., LRFU: A Spectrum of Policies that Subsumes the Least Recently Used & Least Frequently Used Policies, IEEE Trans. Computers, vol. 50, No. 12, 2001, pp. 1352-1361.

Y. Zhou et al., "The Multi-Queue Replacement Algorithm for Second-Level Buffer Caches," Proc. Usenix Ann. Tech. Conf. (Usenix 2001). pp. 91-104.

N. Megiddo et al., "ARC: A Self-Tuning, Low Overhead Replacement Cache," Proc. Usenix Conf. File and Storage Technologies (FAST 2003), Usenix, 2003, pp. 115-130.

* cited by examiner

METHOD FOR IMPROVING FREQUENCY-BASED CACHING ALGORITHMS BY MAINTAINING A STABLE HISTORY OF EVICTED ITEMS

BACKGROUND OF THE INVENTION

1. Field of the Invention

The present invention relates generally to improving caching algorithms, and in particular to maintaining a stable history of evicted memory pages.

2. Background Information

Cache memory management algorithms have been an area of active research for many decades. Cache memories are implemented in processors, operating systems, storage controllers, databases, web servers, application servers and applications. One reason caching is popular is because it is a very effective technique for reducing latency and reducing memory space load on lower levels of memory hierarchy. Caching continues to be an area of active research for caching solutions in increasing hit-rates for different workload scenarios. Any incremental increase in hit-rate has a substantial impact on performance, which is often perceivable by a user in terms of improved latency and throughput.

SUMMARY OF THE INVENTION

The invention provides a frequency-based caching process which maintains a stable history of evicted items from a cache. One embodiment involves a process for caching data in a cache memory comprising logical pages by detecting that a first page is being evicted from the cache memory, and in response, adding metadata of the first page to a stable history list upon an admission determination. Upon detecting a cache miss for a second page, if the stable history list contains metadata for the second page, then removing the second page metadata from the stable history list and performing promotion determination for the second page to determine a priority value for the second page metadata, and placing the second page in the cache memory based on the priority data. Upon detecting that metadata of a third page is to be evicted from the stable history list, performing an eviction determination to select the third page from the stable history list and evict metadata of the third page from the stable history list.

In another embodiment of the invention, an apparatus for caching data in a cache memory including logical pages includes at least one caching module connected to the cache memory. The caching module includes an admission module configured to determine whether to store metadata of a first page to a stable history list upon detecting that the first page is being evicted from the cache memory. The caching module further includes a promotion module configured to detect a cache miss for a second page, and if the stable history list contains metadata for the second page, then removing the second page metadata from the stable history list. The promotion module determines a priority value for the second page metadata and stores the second page in the cache memory based on the priority data. The caching module further includes an eviction module configured to determine whether to evict metadata of a third page from the stable history list.

Yet another embodiment of the invention provides a computer program product for caching data in a cache memory comprising a computer usable medium including a computer readable program, wherein the computer readable program when executed on a computer causes the computer to: upon detecting that a first page is being evicted from the cache memory, perform an addition process to determine whether to add metadata of the first page to a stable history list. Upon detecting a cache miss for a second page, if the stable history list contains metadata for the second page, then delete the second page metadata from the stable history list and apply a promotion process for the second page to determine a priority value for the second page metadata and store the second page in the cache memory based on the priority data. Upon detecting that metadata needs to be evicted from the stable history list, apply an eviction process to select metadata of a third page to evict metadata of the third page from the stable history.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of improving frequency-based caching algorithms by maintaining a stable history of evicted items, as well as operation and/or component parts thereof. While the following description will be described in terms of caching processes and devices for clarity and to place the invention in context, it should be kept in mind that the teachings herein may have broad application to all types of caching systems, devices and applications.

The invention provides a caching process which maintains a stable history of evicted items from a cache. Maintaining a stable history aids in the caching process by using the history to guide future cache policy decisions and thus to improve cache hit performance. In many caching policies, the cache becomes polluted with pages which will not be accessed again during "scan" and "random" periods of the workloads. Such "scan" and "random" periods also fill up normal cache history lists (or "ghost" caches) with information about useless pages. However if the cache history is made stable by not allowing it to be polluted by such periods in workloads it can lead to better cache performance. Maintaining a stable cache history by the embodiments of the invention during cache processes like "scan" and "random" periods in workloads improves the likelihood of cache hits, which decreases latency and improves performance of caching processes.

One embodiment involves a process for caching data in a cache memory comprising logical pages by detecting that a first page is being evicted from the cache memory, and in response performing an admission process to decide whether metadata about the page should be added to a stable history list, and adding the metadata if so decided. Upon detecting a cache miss for a second page, if the stable history list contains metadata for the second page, then removing the second page metadata from the stable history list and performing a promotion process for the second page to determine a priority value for the second page metadata, and placing the second page in the cache memory based on the priority data. Upon detecting that metadata needs to be evicted from the stable history list, performing an eviction process to choose a third page in the stable history list whose metadata should be evicted and to evict metadata of the third page from the stable history list.

Figure 1:
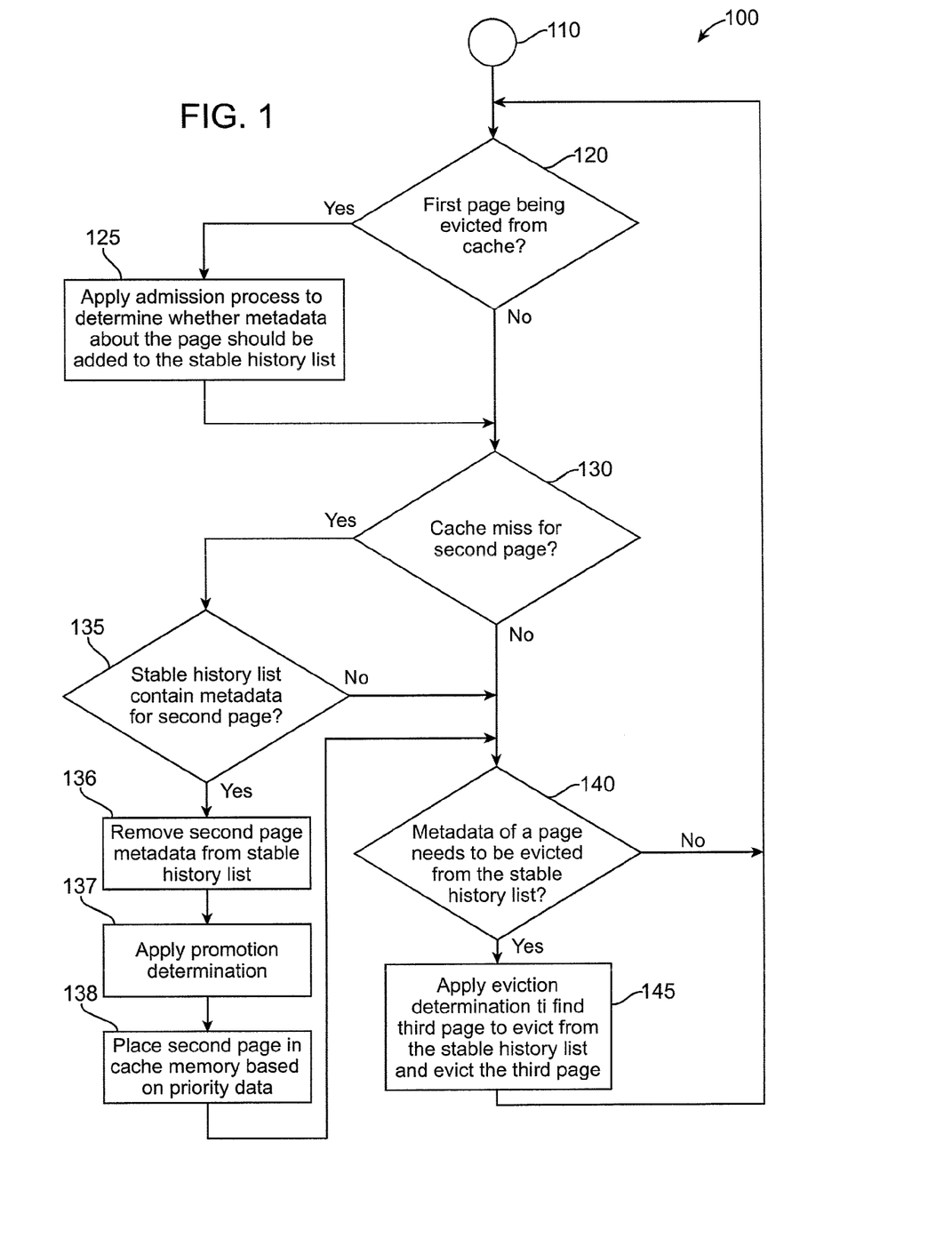
FIG. 1 illustrates a method for improving frequency-based caching algorithms by maintaining a stable history of evicted items, according to an embodiment of the invention.

FIG. 1 illustrates process 100 for improving frequency-based caching processes by maintaining a stable history of data items (e.g., memory pages) evicted from a cache, according to an embodiment of the invention. The process 100 begins at block 110 where initialization takes place. In this embodiment, initialization includes clearing memory and setting all flags (i.e., true/false) to a user selected predefined initialized settings (e.g., zero all memory, set all flags to false, etc.). After initialization, process 100 continues with block 120. The cache memory may contain one or more logical memory pages which may be evicted by a cache management process. At block 120 it is determined if a first page (i.e., a logical memory page) is being evicted from the cache memory. In one embodiment, if the first page is being evicted from the cache memory, process 100 continues with block 125. In this embodiment of the invention, if it is determined in block 120 that a first page is not being evicted from the cache, process 100 continues with block 130.

In block 125, an admission process is applied to decide whether the metadata of the first logical page should be added to the stable history list, and if the decision is made then metadata of the first page is added to a stable history list. Otherwise, metadata about the first page is discarded without being stored in the stable history list. In one example, only upon determining that the stable history list is not filled up, is the metadata of the first logical page added to the stable history list. In another example, metadata about the first page is added to the history list after performing an eviction from the stable history list to make room.

In one embodiment of the invention, the stable history list comprises a stored list that includes metadata of logical pages. Metadata may include descriptions, parameters, priority, date, time, and other pertinent information regarding logical pages. After block 125 has completed, process 100 continues with block 130.

In block 130, it is determined if a cache miss occurs for a second logical page. In one embodiment of the invention, if a cache miss occurs for a second logical page, process 100 continues to block 135. In this embodiment, if a cache miss does not occur for a second logical page, process 100 continues to block 140.

In block 135, it is determined if the stable history list contains metadata for a second logical page. If it is determined that the stable history list does not contain metadata for a second logical page, process 100 continues with block 140. If it is determined that the stable history list does contain metadata for a second logical page, process 100 continues with block 136. In block 136, the second page metadata is removed from the stable history list due to the cache miss. Process 100 continues with block 137 where a promotion determination is applied. In one embodiment of the invention, promotion determination includes determining a priority value for the second page. In this embodiment, the priority is based on the value at the last discard time for the second page. Process 100 continues with block 138 where the second page is based on the priority value. Process 100 then continues with block 140.

In block 140, it is determined if metadata of a page is to be evicted from the stable history list. If it is determined that metadata of a page is not to be evicted from the stable history list, then process 100 continues with block 120. If it is determined that metadata of a page is to be evicted from the history page, process 100 continues with block 145 where eviction determination is applied. In this embodiment, the eviction determination chooses a third page whose metadata is evicted from the stable history list. In one embodiment, the third page is picked using the least recently used (LRU) caching rule, and metadata about the third page is removed from the stable history list. In another embodiment the eviction determination uses the least frequently used (LFU) caching rule to pick the third page and metadata about the third page is removed from the stable history list. It should be noted that other caching rules can also be implemented, such as most frequently used (MFU), most recently used (MRU), etc. Process 100 continues after block 145 returning to block 120.

The above embodiments of the invention can be implemented with different caching processes that assist in cache memory management in processors, operating systems, storage controllers, databases, web servers, application servers, applications, etc.

Figure 2:
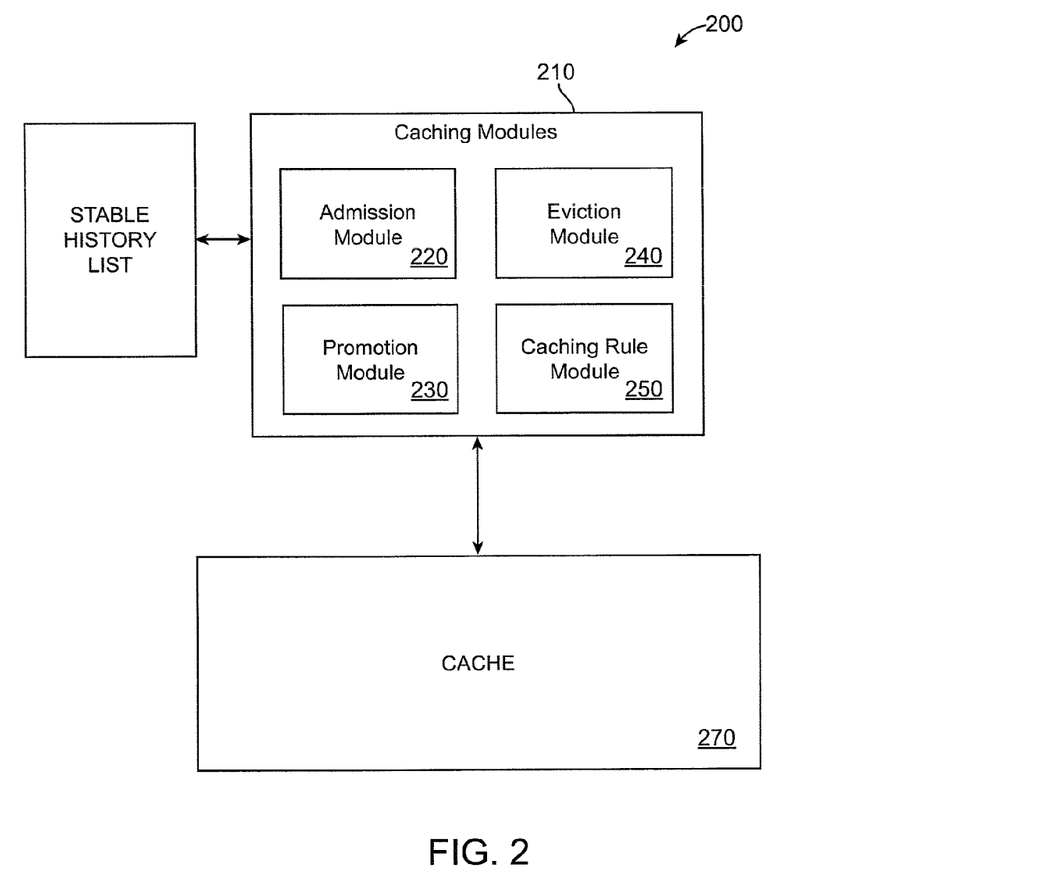
FIG. 2 illustrates a caching module for improving frequency-based caching algorithms by maintaining a stable history of evicted items, according to yet another embodiment of the invention.

FIG. 2 illustrates a device 200 for caching data in a cache memory including logical pages. Device 200 includes at least one caching module 210 connected to cache memory 270 and a stable history list 260. In one embodiment of the invention, the caching module 210 is included either as part of or connected to a processor, a memory device, a database, etc., to assist in caching. In one embodiment, the caching module 210 incorporates the embodiments of the invention with respect to process 100.

In one embodiment of the invention, caching module 210 includes an admission module 220 that is configured to determine whether metadata of a first page should be stored in the stable history list and if so determined to store metadata of the first logical page to the stable history list 260 upon detecting that the first logical page is being evicted from the cache memory 270. The caching module 210 further includes a promotion module 230 that is configured to detect a cache miss for a second logical page, and if the stable history list 260 contains metadata for the second logical page, then operates to remove the second page metadata from the stable history list 260 and determine a priority value for the second page metadata and store the second page in the cache memory 270 based on the priority data. The caching module 210 further includes an eviction module 240 configured to choose a third logical page from the stable history list based on a predetermined caching rule in caching module 250 and to evict metadata of the third logical page from the stable history list 260.

In one embodiment of the invention the promotion module 230 further operates to store a priority value for the second logical page in metadata for the second page and to store the second page in the cache memory 270 based on the priority value.

In one embodiment of the invention, the admission module 220 operates to store metadata of the first logical page to the stable history list 260 in response to the stable history list 260 not being full, and in response to the stable history list 260 being full, to discard metadata of the first page without storing it in the stable history list.

In one embodiment, the promotion module 230 further operates to retain a priority value stored at a last time the second page metadata was stored in the stable history list 260.

In one embodiment of the invention, the caching rule module 250 includes a predetermined caching rule that operates to delete LRU third logical page in response to determining that the metadata of the third logical page is to be evicted from the stable history list 260. In another embodiment, the predetermined caching rule operates to remove a LFU third page metadata from the stable history list 260 in response to determining that the metadata of the third logical page is to be evicted.

Figure 3:
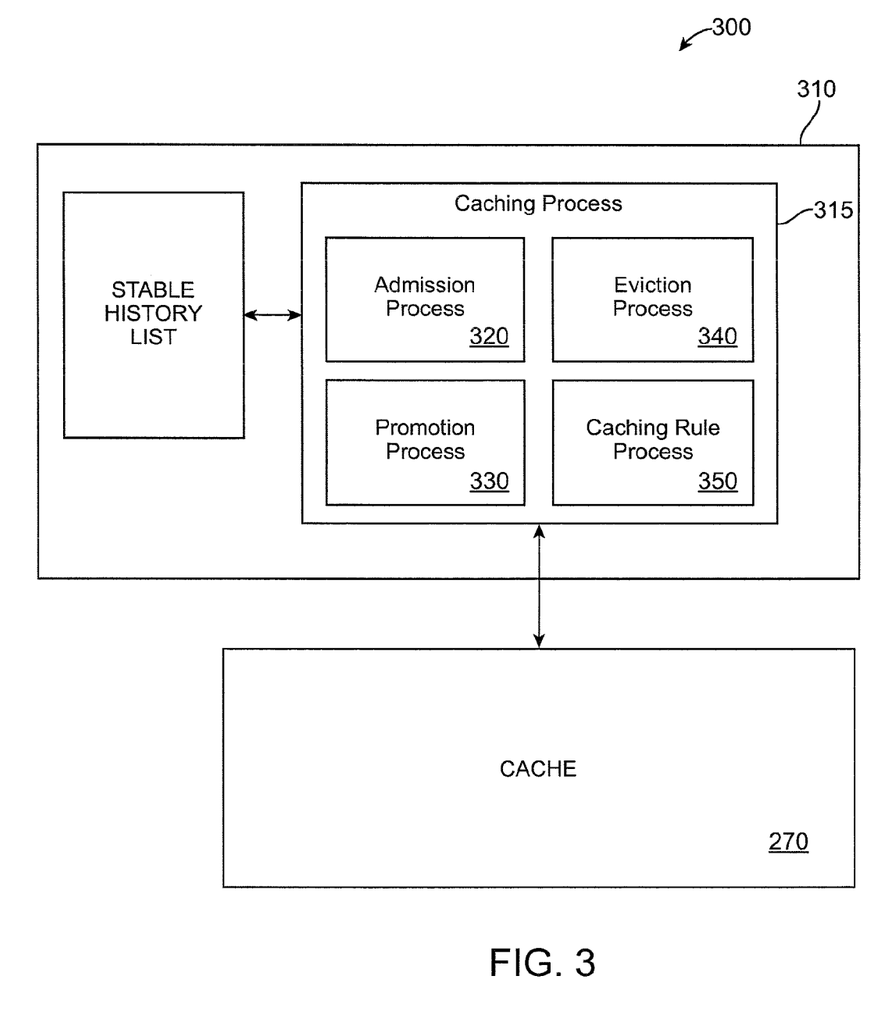
FIG. 3 illustrates a caching process for improving frequency-based caching algorithms by maintaining a stable history of evicted items, according to still another embodiment of the invention.

FIG. 3 illustrates another embodiment of the invention of a device 300 including a processor 310 including at least one caching process 315 for improving frequency-based caching algorithms by maintaining a stable history of evicted items coupled to a cache memory 270. In one embodiment of the invention, the processor 310 implements a caching process 315 that is executed in processor memory. In this embodiment of the invention, the caching process 315 includes an admission process 320, a promotion process 330, an eviction process 340 and a caching rule process 350. In one embodiment of the invention, the caching process 315 is coupled to a stable history list 360 that operates to store metadata of logical pages. In one embodiment of the invention, the caching process 315 is a computer program product accessible from a computer-usable or computer-readable medium providing program code for use by or in connection with the processor 310.

In one embodiment of the invention, caching process 315 incorporates the embodiments with respect to the above-mentioned process 100. In one embodiment of the invention, caching process 315 includes: an admission process 320 configured to determine whether metadata of a first page should be stored in the stable history list 360 and to store metadata of the first logical page to the stable history list 360 if so determined, upon detecting that the first logical page is being evicted from the cache memory 270; a promotion process 330 configured to detect a cache miss for a second logical page, and if the stable history list 360 contains metadata for the second logical page, then operates to remove the second page metadata from the stable history list 360 and determine a priority value for the second page metadata and stores the second page in the cache memory 270 based on the priority data; and an eviction module 340 configured to evict metadata of the third logical page from the stable history list 360 based on a predetermined caching rule contained in caching rule process 350.

In one embodiment of the invention, the promotion process 330 further operates to store a priority value for the second logical page in metadata for the second page and to store the second page in the cache memory 270 based on the priority value.

In one embodiment of the invention, the admission process 320 operates to store meta-data of the first logical page to the stable history list 360 in response to the stable history list 360 not being full, and in response to the stable history list 360 being full, to discard the metadata of the first page without storing it in the stable history list 360.

In one embodiment the promotion process 330 further operates to retain a priority value stored at the time the second page metadata was stored in the stable history list 360.

In one embodiment of the invention, the caching rule process 350 includes a predetermined caching rule that operates to delete LRU third logical page in response to determining that the metadata of the third logical page is to be evicted from the stable history list 360. In another embodiment the predetermined caching rule operates to remove a LFU third page metadata from the stable history list 360 in response to determining that the metadata of the third logical page is to be evicted.

The following example illustrates an improved caching algorithm incorporating an embodiment of the invention. This application uses similar notation as in U.S. Pat. No. 6,996,676 by Nimrod Megiddo and Dharmendra Shantilal Modha, filed on Nov. 14, 2002 and titled System And Method For Implementing An Adaptive Replacement Cache Policy, owned by the same Assignee of the present Application, International Business Machines Corporation, and is herein incorporated by reference In this embodiment of the invention, the size of the cache is set to 'c' (where c is the number of pages) with the amount of metadata maintained in a stable history list equal to at most "c." The example will be given in pseudo code with explanations. The input streams in this example are given as $x\_1$, $x\_2, \ldots, x\_t$. During initialization, set $p=0$ (where p is roughly the target size of the LRU list) and set the LRU lists $T\_1, B\_1, T\_2,$ and $B\_2$ (where B is a history list) to empty.

Figure 4:
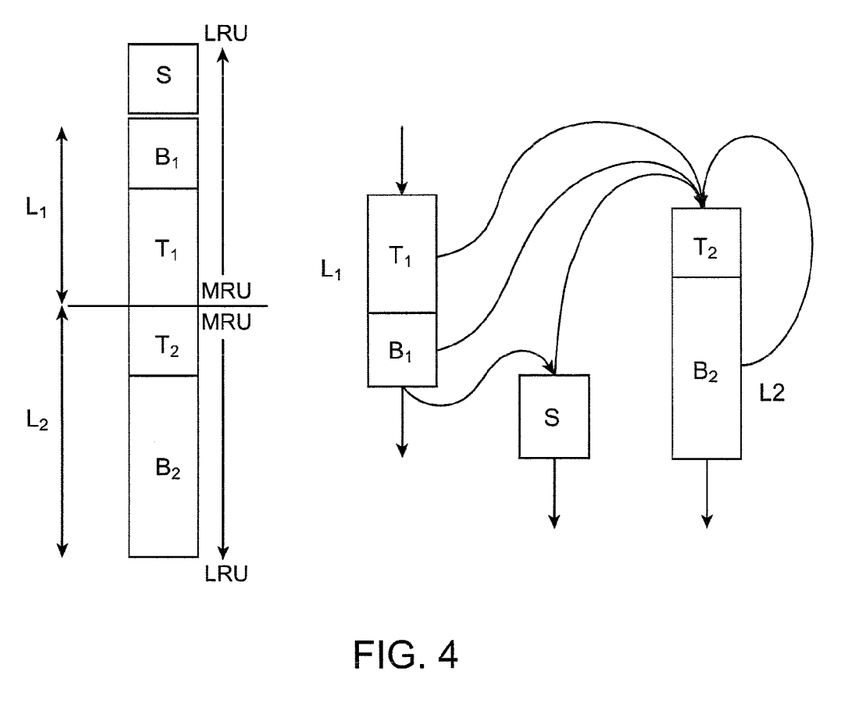
FIG. 4 illustrates interaction between lists for an example of a caching routine incorporating an embodiment of the invention.

FIG. 4 illustrates interaction between LRU/MRU lists for the following cases. In the following example of a caching process according to an embodiment of the invention, for every $t>=1$ and any $x\_t$ (requested page), one and only one of the following cases must occur. It should be noted that the example caching process is known as STARCH or Stable ARC (Adaptive Replacement Cache) History.

Case I: $x\_t$ is in $T\_1$ or $T\_2$. In this case, a cache hit has occurred in this caching algorithm.

Move $x\_t$, to MRU position in $T\_2$.

Case II: $x\_t$, is in $B\_1$. In this case, a cache miss has occurred in this caching algorithm.

Perform adaptation by the following: Update $p=\min\{p+d\_1, c\}$ where $d\_1=1$ if $|B\_1|>=|B\_2|$ otherwise $d\_1=|B\_2|/|B\_1|$ Perform replace ($x\_t$, p) by the following: Move $x\_t$, from $B\_1$ to the MRU position in $T\_2$ (also fetch $x\_t$, to the cache).

Case III: $x\_t$, is in $B\_2$. In this case, a cache miss has occurred in this caching algorithm.

Perform adaptation by: Update $p=\max\{p-d\_2, 0\}$ where $d\_2=1$ if $|B\_2|>=|B\_1|$ otherwise $d\_1=|B\_1|/|B\_2|$ Perform replace ($x\_t$, p) by: Move $x\_t$, from $B\_2$ to the MRU position in $T\_2$ (also fetch $x\_t$, to the cache).

Case IIIA: $x\_t$, is in S (i.e., the history list or "stable" history list). In this case, a cache miss has occurred in this caching algorithm.

Do not perform adaptation

Perform replace ($x\_t$, p) by: Move $x\_t$, from S to the MRU position in $T\_2$ (also fetch $x\_t$, to the cache).

Case IV: $x\_t$, is not in $T\_1, B\_1, T\_2, B\_2,$ S. In this case, a cache miss has occurred in the caching algorithm.

```
Set v = (empty) [Victim page]
Case A: L__1 = T__1 (union) B__1 has exactly c pages.
    If (|T__1| < c)
        Delete LRU page in B__1 (x). replace(x_t, p).
        Set v = x
    else
        Here B__1 is empty. Delete LRU page in T__1 (x) (also
remove it from the cache).
        Set v = x
    endif
Case B: L__1= T__1 (union) B__1 has less than c pages.
    If (|T__1| + |B__1| + |T__2| + |B__2| >= c)
        Delete LRU page in B__2, if (|T__1| + |B__1| + |T__2| +
        |B__2| = 2c).
        replace(x_t, p).
    endif
if (v != (empty)) and (|S| + |T__1| + |B__1| + |T__2| + |B__2| < (2c − 1))
[ADMISSION CONTROL]
    Add v to MRU position in S
endif
if (|T__1| + |B__1| + |T__2| + |B__2| + |S| = 2c)
    Delete LRU page in S [STABLE HISTORY EVICTION]
endif
```

Finally, fetch x_t to the cache and move it to the MRU position in T__1.

Subroutine Replace (x_t, p)
  If ((|T__1| is not zero) and ((|T__1| exceeds the target p) or (x_t is in B__2 and |T__1|=p)))
    Delete the LRU page (x) in T__1 (also remove it from the cache), and move it to MRU position in B__1.
  else
    Delete the LRU page (x) in T__2 (also remove it from the cache), and move it to MRU position in B__2.
  endif The invariants that are maintained after each step of the algorithm are:
1. $|L\_1|<=c$
2. $|L\_2|<=2c$
3. $|L\_1|+|L\_2|+|S|<=2c$
4. $|T\_1|+|T\_2|<=c$ Referencing the decisions related to stable history, the adapted caching algorithm includes the following:
  ADMISSION decision
    Admit when $|S|+|T\_1|+|T\_2|+|B\_1|+|B\_2|<(2c-1)$
  EVICTION decision
    Pages are removed from S when required for its history lists, that is, when $|B\_1|+|B\_2|$ grows. S has the lowest priority of the three history lists to ensure that the function of the caching algorithm is maintained as much as possible. It should be noted that any pages that are evicted from the stable list due to size constrains are completely discarded.
  PROMOTION decision
  For the caching process example according to one embodiment of the invention, if an item is found on the history list, S, rather than admitting it to TI, it is placed in T__2, representing the fact that it has be previously requested. The presence in T__2 will protect this item from being evicted by the churn of a "scan" workload on T__1.

In the above example, the history list is stabilized without changing the maximum amount of metadata that the base algorithm needs to maintain. The eviction decision from the "stable" history list is not separately tunable. Similarly, the admission decision follows gracefully from the base decisions of ARC. An item is added to stable history when ARC has chosen to maintain less than the maximum amount of history. Compared to ARC, STARCH adds a constant amount of time to each data access, and has no impact on the memory footprint.

Figure 5:
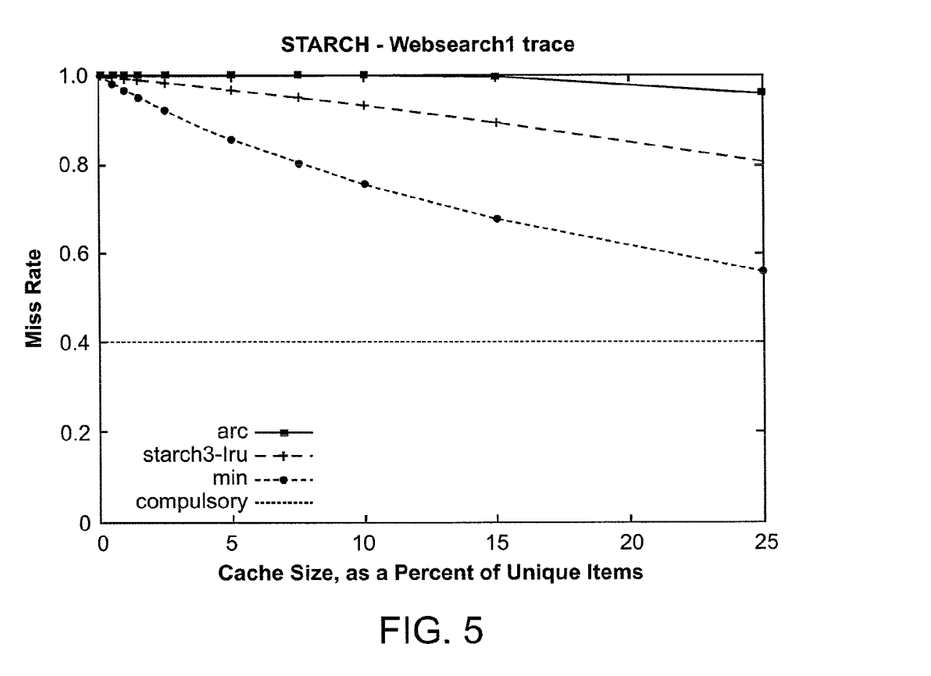
FIGS. 5-7 illustrate examples of traces for graphs of miss rate versus cache size for an exemplar caching routine incorporating an embodiment of the invention.
Figure 6:
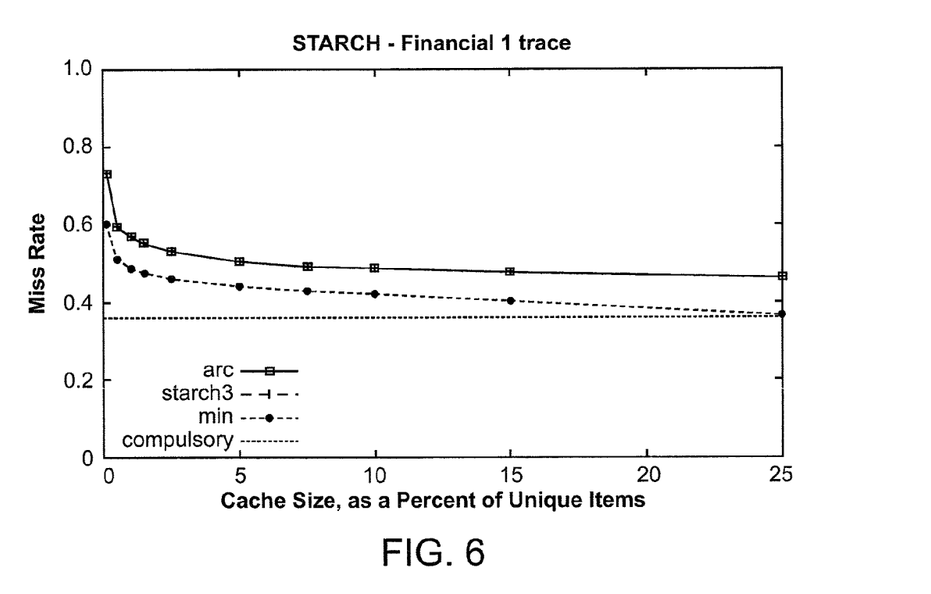
Figure 7:
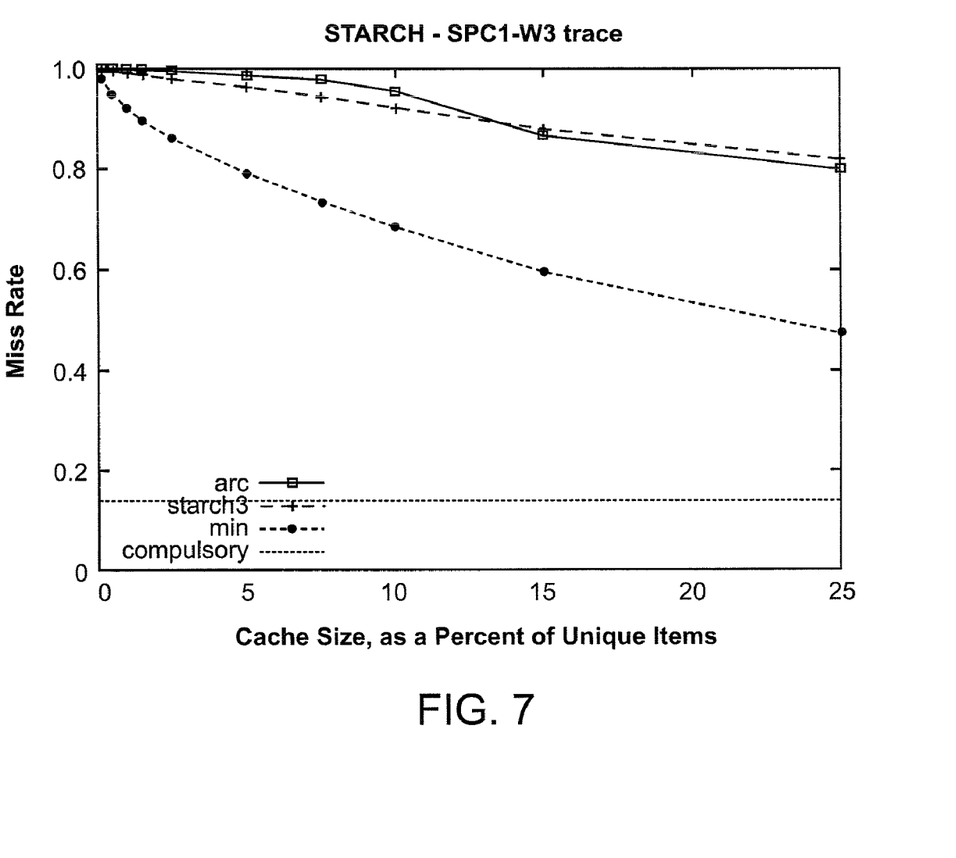

FIGS. 5-7 illustrate examples of traces for graphs of miss rate versus cache size for an exemplar caching routine incorporating an embodiment of the invention (i.e., STARCH) versus an unamended caching algorithm ARC.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for caching data in a cache memory including logical pages, comprising:
   upon detecting that a first page is being evicted from the cache memory, adding metadata of the first page to a stable history list upon an admission determination based on capacity state of the stable history list;
   upon detecting a cache miss for a second page, if the stable history list contains metadata for the second page, then removing the second page metadata from the stable history list and performing a promotion determination for the second page to determine a priority value for the second page metadata and placing the second page in the cache memory based on the priority data; and
   upon detecting that metadata of a third page is to be evicted from the stable history list, performing an eviction determination to select the third page from the stable history list and evict metadata of the third page from the stable history list by removing a least frequently used (LFU) third page metadata from the stable history list in response to the determination that the metadata of the third page is to be evicted.

2. The method of claim 1, wherein the admission determination based on capacity state of the stable history list further comprises:
   upon determining that the stable history list is not full, adding the metadata of the first page to the stable history list, otherwise upon determining that the stable history list is full, adding the metadata of the first page to the stable history list after performing an eviction of metadata from the stable history list.

3. The method of claim 1, further comprising:
   in response to a cache miss for the first page, removing the first page metadata from the stable history list.

4. The method of claim 1, wherein the addition process further comprises:
   adding metadata of the first page to the stable history list upon passing a predetermined criteria.

5. The method of claim 1, wherein the performing a promotion determination for the second page further comprises:
   retaining a priority value assigned at a last time the second page metadata was added to the stable history list.

6. The method of claim 1, wherein the performing an eviction determination comprises:
   removing a least recently used (LRU) third page metadata from the stable history list in response to the determination that the metadata of the third page is to be evicted.

7. An apparatus for caching data in a cache memory including logical pages, comprising:
   a hardware processor coupled with
      at least one caching module coupled to the cache memory;
   the at least one caching module including:
      an admission module configured to determine whether to store metadata of a first page to a stable history list based on capacity state of the stable history list upon detecting that the first page is being evicted from the cache memory;
      a promotion module configured to detect a cache miss for a second page, and if the stable history list contains metadata for the second page, then operates to remove the second page metadata from the stable history list and determine a priority value for the second page metadata and store the second page in the cache memory based on the priority data; and
      an eviction module configured to determine whether to evict metadata of a third page from the stable history list by removing a least frequently used (LFU) third page metadata from the stable history list in response to determining that the metadata of the third page is to be evicted.

8. The apparatus of claim 7, wherein the promotion module further operates to store a priority value for the second page in metadata for the second page and to store the second page in the cache memory based on the priority value.

9. The apparatus of claim 7, wherein the admission module operates to store meta-data of the first page to the stable history list in response to the stable history list not being full, and in response to the list being full, to store the metadata of the first page in the stable history list after removing previously stored metadata from the stable history list.

10. The apparatus of claim 7, wherein the promotion module further operates to retain a priority value stored at a last time the second page metadata was stored in the stable history list.

11. The apparatus of claim 7, wherein the eviction module is further configured to delete a least recently used (LRU) third page in response to determining that the metadata of the third page is to be evicted from the stable history list.

12. A computer program product for caching data in a cache memory comprising a non-transitory computer usable medium including a computer readable program, wherein the computer readable program when executed on a computer causes the computer to:
   upon detecting that a first page is being evicted from the cache memory, perform an addition process to determine whether to add metadata of the first page to a stable history list based on capacity state of the stable history list;
   upon detecting a cache miss for a second page, if the stable history list contains metadata for the second page, then delete the second page metadata from the stable history list and apply a promotion process for the second page to determine a priority value for the second page metadata and store the second page in the cache memory based on the priority data; and
   upon detecting that metadata needs to be evicted from the stable history list, apply an eviction process to select metadata of a third page to evict metadata of the third page from the stable history by deleting a least frequently used (LFU) third memory page metadata from the stable history list in response to determining that the metadata of the third memory page is to be deleted.

13. The computer program product of claim 12, wherein the promotion process further includes assigning a priority value for the second page and storing the second page in the cache memory based on the assigned priority value.

14. The computer program product of claim 12, wherein the admission process further comprises:
   upon determining that the stable history list is not full, adding the metadata of the first page to the stable history list, otherwise upon determining that the stable history list is full, adding the metadata of the first page to the stable history list after performing an eviction of metadata from the stable history list.

15. The computer program product of claim 12, wherein the admission process further comprises:
   in response to passing a predetermined criteria, storing metadata of the first page to the stable history list.

16. The computer program product of claim 12, wherein the promotion process further comprises:
retaining a priority value assigned at a last time the second page was stored to the stable history list.

17. The computer program product of claim 12, wherein the eviction process further includes:
deleting a least recently used (LRU) third page metadata from the stable history list in response to determining that the metadata of the third page is to be deleted.

* * * * *